United States Patent [19]

Agazzi

[11] Patent Number: 5,329,586
[45] Date of Patent: Jul. 12, 1994

[54] NONLINEAR ECHO CANCELLER FOR DATA SIGNALS USING A NON-REDUNDANT DISTRIBUTED LOOKUP-TABLE ARCHITECTURE

[75] Inventor: Oscar E. Agazzi, Florham Park, N.J.

[73] Assignee: AT&T Bell Laboratories, Murray Hill, N.J.

[21] Appl. No.: 891,357

[22] Filed: May 29, 1992

[51] Int. Cl.$^5$ ............................................. H04M 1/00
[52] U.S. Cl. ..................................... 379/406; 379/410; 379/411; 364/725; 364/726; 364/724.2
[58] Field of Search ................... 379/410, 411, 406; 364/724, 725, 726

[56] References Cited

U.S. PATENT DOCUMENTS

| | | | |
|---|---|---|---|
| 4,605,826 | 8/1986 | Kanemasa | 379/411 |
| 4,609,787 | 9/1986 | Horna | 379/411 |
| 4,669,116 | 5/1987 | Agazzi et al. | 379/411 |
| 4,694,451 | 9/1987 | Adams et al. | 370/32.1 |
| 4,977,591 | 12/1990 | Chen | 379/410 |
| 5,007,044 | 4/1991 | Miyoshi et al. | 379/411 |
| 5,148,427 | 9/1992 | Buttle et al. | 379/411 |
| 5,153,875 | 10/1992 | Takatori | 379/410 |

OTHER PUBLICATIONS

D. W. Lin and M. L. Liou "A tutorial on digital subscriber line transceiver for ISDN" *Proc. ISCAS*-88 May 1988 pp. 839-846.

D. G. Messerschmitt, "Design issues in the ISDN U-interface transceiver," *IEEE J. Selected Areas Commun.*, vol. SAC-4, No. 8, pp. 1281-1293, Nov. 1986.

O. Agazzi et al., "Large scale integration of hybrid-method digital subscriber loops," *IEEE Trans. Commun.*, vol. COM-30, pp. 2095-2108, Sep. 1982.

O. Agazzi et al., "Nonlinear echo cancellation of data signals," *IEEE Trans. Commun.*, vol. COMM-30, No. 11, pp. 2421-2433, Nov. 1982.

N. Holte and S. Stueflotten, "A new digital echo canceller for two-wire subscriber lines," *IEEE Trans. Commun.*, vol. COMM-29, Nov. 1981, pp. 1573-1581.

C. F. N. Cowan et al., "Non-linear system modelling: Concept and application," *Proc. ICASSP*-84, San Diego, Calif., Mar. 1984, pp. 45.6.1-45.6.4.

G. L. Sicuranza et al., "Adaptive echo cancellation with nonlinear digital filters," *Proc ICASSP*-84, San Diego, Calif., Mar. 1984, pp. 3.10.1-3.10.4.

G. L. Sicuranza and G. Ramponi, "Distributed arithmetic implementation of nonlinear echo cancellers," *Proc. ICASSP*-85, Tampa, Fla., Mar. 1985, pp. 1617-1620.

O. Agazzi et al., "Timing recovery in digital subscriber loops," *IEEE Trans. Commun.*, vol. COMM-33, No. 6, pp. 558-569, Jun. 1985.

*Primary Examiner*—James L. Dwyer
*Assistant Examiner*—Jacques M. Saint-Surin
*Attorney, Agent, or Firm*—William Ryan; Katharyn E. Olson

[57] ABSTRACT

An echo canceler and associated method for canceling errors encountered in data communications which features reduced complexity and enhanced convergence properties arising from simplification of a table-lookup architecture corresponding to elimination of terms in a Volterra expansion. By adaptively adjusting the values stored in the reduced complexity lookup-tables, the system converges rapidly to the desired values.

16 Claims, 4 Drawing Sheets

NONLINEAR ECHO CANCELLER FOR DATA SIGNALS USING A NON-REDUNDANT DISTRIBUTED LOOKUP-TABLE ARCHITECTURE

BACKGROUND OF THE INVENTION

This invention relates to nonlinear echo cancellation of data signals.

Many data communications systems, e.g., telephone digital subscriber loop transceivers and voiceband modems, use the principle of echo cancellation to achieve full-duplex transmission over a two-wire telephone line. See, for example, D. W. Lin and M. L. Liou, "A tutorial on digital subscriber line transceiver for ISDN," *Proc. ISCAS*-88, May 1988, pp. 839–846, D. G. Messerschmitt, "Design issues in the ISDN U-interface transceiver," *IEEE J. Selected Areas Commun.*, vol. SAC-4, No. 8, pp. 1281–1293, November 1986, O. Agazzi, D. A. Hodges, and D. G. Messerschmitt, "Large-scale integration of hybrid-method digital subscriber loops," *IEEE Trans. Commun.*, vol. COM-30, pp. 2095–2108, September 1982, and O. Agazzi, D. G. Messerschmitt, and D. A. Hodges, "Nonlinear echo cancellation of data signals," *IEEE Trans. Commun.*, vol. COMM-30, No. 11, pp. 2421–2433, November 1982.

As noted in each of the last two cited references, the performance of echo cancelers can be severely degraded by the presence of nonlinear distortion in the echo signal. This nonlinear distortion is frequently introduced by analog circuits such as digital to analog converters and power amplifiers (typically used to drive the telephone line). Although the use of advanced circuit design techniques and semiconductor technology have resulted in significant reductions in the nonlinear distortion introduced by these circuits, nonlinearity still remains a limiting factor for the performance of data communications systems that use echo cancellation. To overcome this problem, these systems often incorporate nonlinear echo cancelers.

Nonlinear echo cancelers for data signals can be broadly classified into two categories: (1) Structures based on a Volterra series expansion, as described, e.g., in the above-cited Agazzi, Messerschmitt and Hodges paper, and (2) lookup table structures of the type described in N. Holte and S. Stueflotten, "A new digital echo canceller for two-wire subscriber lines," *IEEE Trans. Commun.*, vol. COMM-29, November 1981, C. F. N. Cowan and P. F. Adams, "Non-linear system modelling: Concept and application," *Proc. ICASSP*-84, San Diego, Calif., March 1984, P. F. Adams and C. F. N. Cowan, "Adaptive digital filter," U.S. Pat. No. 4,694,451, September 15, 1987, G. L. Sicuranza, A. Bucconi, and P. Mitri, "Adaptive echo cancellation with nonlinear digital filters," *Proc. ICASSP*-84, San Diego, Calif., March 1984, G. L. Sicuranza and G. Ramponi, "Distributed arithmetic implementation of nonlinear echo cancellers," *Proc. ICASSP*-85, Tampa, Fla., March 1985.

A full lookup table echo canceler has been described in O. Agazzi, C. P. J. Tzeng, D. G. Messerschmitt, and D. A. Hodges, "Timing recovery in digital subscriber loops," *IEEE Trans. Commun.*, vol. COMM-33, No. 6, pp. 558–569, June 1985 to be equivalent to an echo canceler based on an untruncated Volterra series expansion. Such lookup table structures can take advantage of the advances in memory technology, and lend themselves well to denser and simpler VLSI implementations. However, in many cases a full lookup table requires a random access memory (RAM) of excessive size, leading not only to a costly implementation, but also to slow convergence. For this reason, implementations based on a distributed lookup table architecture have been proposed in the above-cited Cowan and Adams references.

FIG. 1 shows such a block diagram of distributed lookup table system based on a well-known transversal filter structure for the case of a 4-level code and second order nonlinear interaction. This architecture can be quite efficient. However, it can be shown that it contains redundant terms. For example, each of the RAMs in FIG. 1 can compensate for a DC offset term, resulting in a total of R offset cancellation terms, when only one of them is needed. The analysis given below reveals that there are several other redundant terms. This redundancy is undesirable, because it leads to slower convergence, and introduces a potential drift in correlated coefficients, whose effect cancels out at the output, and therefore is not corrected by the adaptation algorithm. When running over a prolonged period of time, this drift could lead to overflows.

SUMMARY OF THE INVENTION

Shortcomings of prior art nonlinear echo cancelers are avoided and a technical advance is made in accordance with one aspect of the present invention, in which there is provided a method to decompose a lookup-table nonlinear echo canceler into a plurality of smaller lookup tables, and for combining outputs of said lookup tables. A method for efficiently adapting the values stored in such distributed lookup tables is provided in accordance with another aspect of the present invention.

According to a another aspect of the present invention, a method is provided for eliminating redundant terms from lookup tables useful in realizing a nonlinear echo canceler.

Using the teachings of the illustrative embodiments described below, distributed lookup table nonlinear echo cancelation is achieved with improved convergence as compared to prior art lookup table nonlinear echo cancelers while avoiding undesirable drift encountered in such prior art echo cancelers.

BRIEF DESCRIPTION OF THE DRAWING

These and other aspects, features and methods of the present invention are described more fully in the following detailed description taken together with the attached drawing in which.

DETAILED DESCRIPTION

Figure 1:
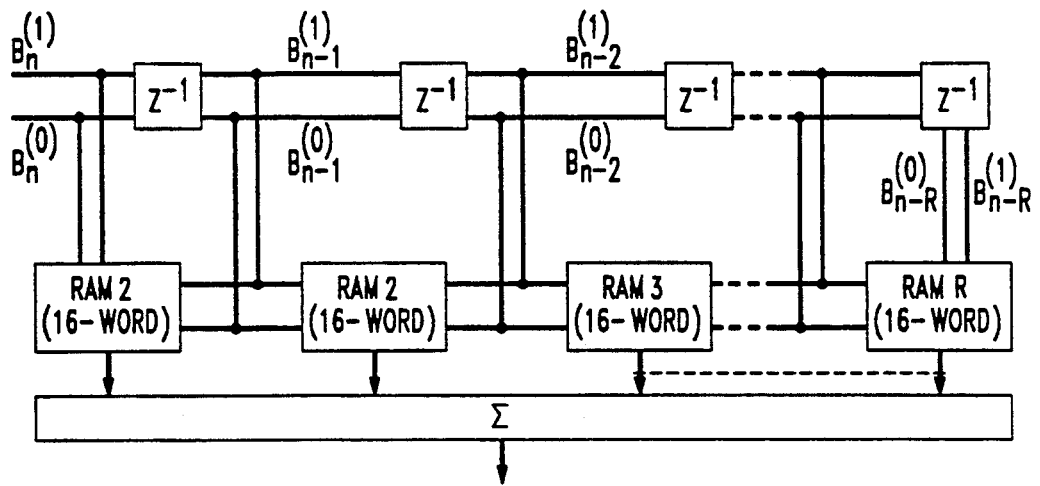
FIG. 1 shows a prior art distributed lookup table canceler.

It has been shown, e.g., in the Agazzi, et al, November, 1982 paper cited above, that a nonlinear function of N bits $f(x_0, x_1, \ldots, x_{N-1})$ can be expanded in the form $$f(x_0, x_1, \ldots, x_{N-1}) = c^{(0)} + \sum_{k=0}^{N-1} c_k^{(1)} x_k + \quad (1)$$

$$\sum_{k_1 k_2 = 0}^{N-1} c_{k_1 k_2}^{(2)} x_{k_1} x_{k_2} + \ldots + c^{(N)} x_{k_1} x_{k_2} \ldots k_N$$

where $x_0, \ldots, x_{N-1} \in \{-1, 1\}$. In the inner product notation of Agazzi, Tzeng, Messerschmitt and Hodges, supra, expansion (1) can be expressed $$f(x_0, x_1, \ldots, x_{N-1}) = x^T \cdot c \quad (2).$$

Define the $2^N$-dimensional vector f whose components are the values of the nonlinear function f for all the $2^N$ combinations of the variables $x_0, \ldots, x_{N-1}$ (any convenient ordering of the components of f can be used, for example the one defined in Appendix A of the above-cited Agazzi, et al, June, 1985 paper. When the vectors x are also formed for all the combinations of values $+1$ and $-1$ of the binary variables $x_k$, an orthogonal basis of the $2^N$-dimensional vector space $R^{2^N}$(the space of all $2^N$-tuples of real numbers) is obtained $$B = \{x_1, x_2, \ldots, x_{2^N}\} \quad (3).$$

The norm of the basis vectors is $2^{N/2}$. The matrix $$M = [x_1, x_2, \ldots, x_{2^N}] \quad (4)$$

is orthogonal, and $$MM^T = 2^N I \quad (5)$$

where I is the $2^N \times 2^N$ identity matrix. Also note that all elements of M are either 1 or $-1$, thus M is a Hadamard matrix.

From (2) it follows that $$f = M^T c. \quad (6)$$

The left hand side of (6) is the lookup table representation of a nonlinear echo cancelor, whereas the right hand side is its Volterra series representation.

If the basis of unit vectors $$B^1 = \{u_1, u_2, \ldots, u_{2^N}\} \quad (7)$$

is introduced (where the $n^{th}$ component of $u_n$ is 1 and and all the others are 0), equation (2) can be obtained from (6) by premultiplying both sides by the appropriate $u_k^T \in B^1$.

The adaptation algorithm for the lookup table can be related to the traditional adaptation algorithm for transversal echo cancelers. As in the Agazzi, et al November, 1982 paper, let the latter be $$c(n+1) = c(n) + \alpha \epsilon(n) x(n) \quad (8)$$

Premultiplying by $M^T$ both sides of (8) and considering that $x(n) \in B$, we obtain:

$$f(n+1) = f(n) + 2^N \alpha \epsilon(n) u(n) \quad (9)$$

which means that only the most recently accessed location is updated. The convergence properties of the lookup table can be derived from (9) using the well known theory of convergence of the transversal echo canceler.

Equation (6) can be factored in a way that allows some undesired terms of the Volterra series expansion to be eliminated from the equivalent lookup table realization.

Let $N = N_1 + N_2$, where $N_1, N_2 > 0$. Vector space $R^{2^N}$ can be represented as the direct product of $R^{2^{N_1}}$ and $R^{2^{N_2}}$. The notation presented above is conveniently modified to make explicit the dimensionality of the appropriate vectors and matrices. Thus, we can write:

$$x_k^{(N)} = x_{k_1}^{(N_1)} \times x_{k_2}^{(N_2)} \quad (10)$$

$$u_k^{(N)} = u_{k_1}^{(N_1)} \times u_{k_2}^{(N_2)} \quad (11)$$

$$M_N = M_{N_1} \times M_{N_2} = (M_{N_1} \times I_{N_2})(I_{N_1} \times M_{N_2}) \quad (12)$$

where $x_k^{(N)} \in B_N$, $x_{k_1}^{(N_1)} \in B_{N_1}$, $x_{k_2}^{(N_2)} \in B_{N_2}$, $u_k^{(N)} \in B'_N$, $u_{k_1}^{(N_1)} \in B'_{N_1}$, and $u_{k_2}^{(N_2)} \in B'_{N_2}$.

Using these expressions, the output of the lookup table echo canceler can be factored as follows:

$$\begin{aligned} f(x_0, x_1, \ldots, x_{N-1}) &= u_k^{(N)T} f = (x_{k_1}^{(N_1)T} \times u_{k_2}^{(N_2)T}) \\ &\quad (I_{N_1} \times M_{N_2}) c = \\ &\quad (x_{k_1}^{(N_1)T} \times u_{k_2}^{(N_2)T}) f_{N_2} \end{aligned} \quad (13)$$

where $f_{N_2} = (I_{N_1} \times M_{N_2}) c$.

In equation (13), $f_{N_2}$ can be seen as a set of $2^{N_1}$ lookup tables, each one consisting of $2^{N_2}$ entries. The total number of entries in all lookup tables is $2^{N_1} 2^{N_2} = 2^N$, the same as in the original implementation. In each one of the $2^{N_1}$ tables, vector $u_{k_2}^{(N_2)T}$ selects one entry, dependent on the particular data signal received. Vector $x_{k_1}^{(N_1)T}$ creates Volterra-type combinations of the lookup table outputs.

The adaptation algorithm for the nonlinear echo canceler described by equation (13) can be derived by pre-multiplying by $(I_{N_1} \times M_{N_2})$ both sides of equation (8). The result is:

$$f_{N_2}(n+1) = f_{N_2}(n) + 2^{N_2} \alpha \epsilon(n) (x^{N_1}(n) \times u_{N_2}(n)) \quad (14).$$

Figure 2:
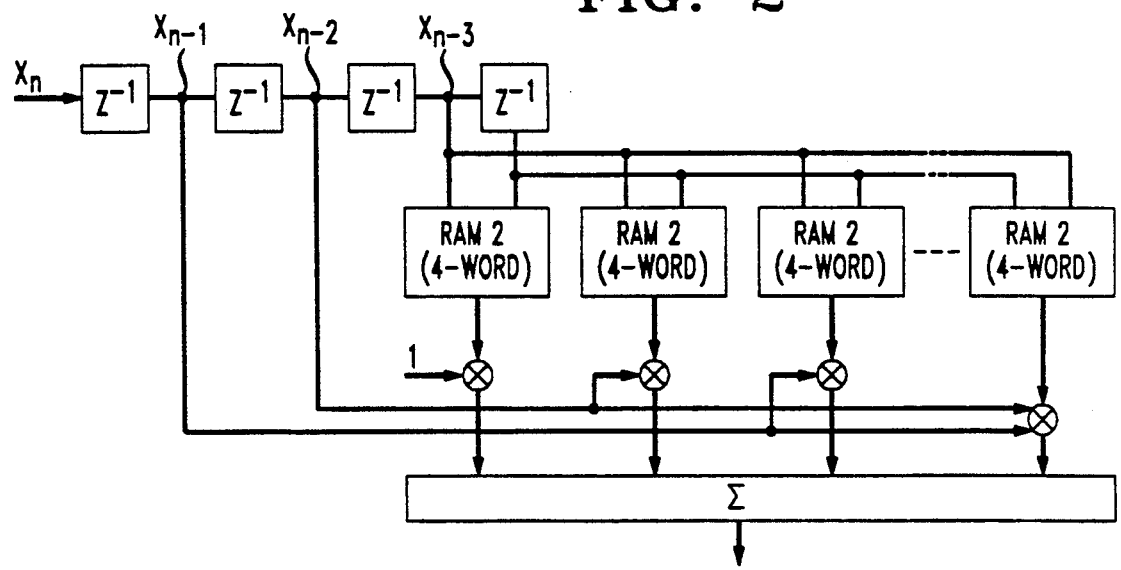
FIG. 2 shows an improved echo canceler with $N_1 = N_2 = 2$.

As an example, a specific embodiment of the nonlinear echo canceler using the organization described by equation (13) is presented in FIG. 2. For simplicity, the specific case $N_1 = N_2 = 2$ is considered here. However the method is general, and can be used for arbitrary values of $N_1$ and $N_2$.

Figure 3:
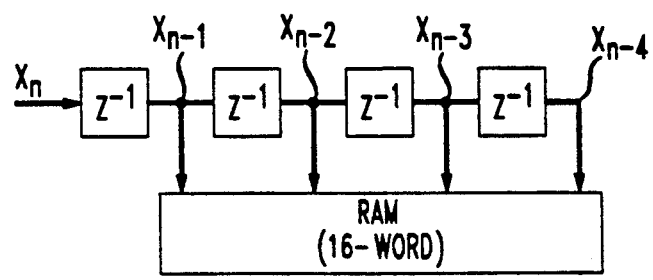
FIG. 3 shows a prior art lookup table echo canceler equivalent to FIG. 2.

The nonlinear echo canceler of FIG. 2 is equivalent to the one of FIG. 3, in the sense that, given the same inputs, it will produce the same outputs. The advantage of the embodiment of FIG. 2, however, can be realized when combined with the distributed lookup table echo canceler of FIG. 1. But before the latter is modified, it is necessary to make explicit the redundancy inherent in this structure. This can be done by computing the Volterra series expansion of each lookup table of FIG. 1. Such expansion consists of 16 terms. If the 4-level symbols are represented as $Q_n = 2B_n^{(1)} + B_n^{(0)}$, the Volterra expansions of the first two lookup tables have in common the following terms:

$$1, B_{n-1}^{(0)}, B_{n-1}^{(1)}, B_{n-1}^{(0)} \cdot B_{n-1}^{(1)} \quad (15).$$

A similar duplication occurs in other pairs of consecutive tables as will appear from a simple enumeration of the terms resulting from the Volterra expansions for any particular lookup-table organization. This duplication is detrimental to the performance of the canceler, because it slows down convergence. Additionally, such duplication permits coefficients representing identical nonlinear terms in the Volterra expansions of two different lookup tables to drift to large values of opposite sign, and eventually overflow, severely degrading the performance of the canceler. Such drift could occur as a result of the stochastic nature of the adaptation algorithm, and the fact that only the sum of the redundant terms is observable at the output, but not their individual values. Since the adaption algorithm uses the cancellation error as observed at the output of the echo canceler, it is unable to correct this drift. Finally, the duplication unnecessarily increases the size of the random access memory used to store the coefficients.

Figure 4:
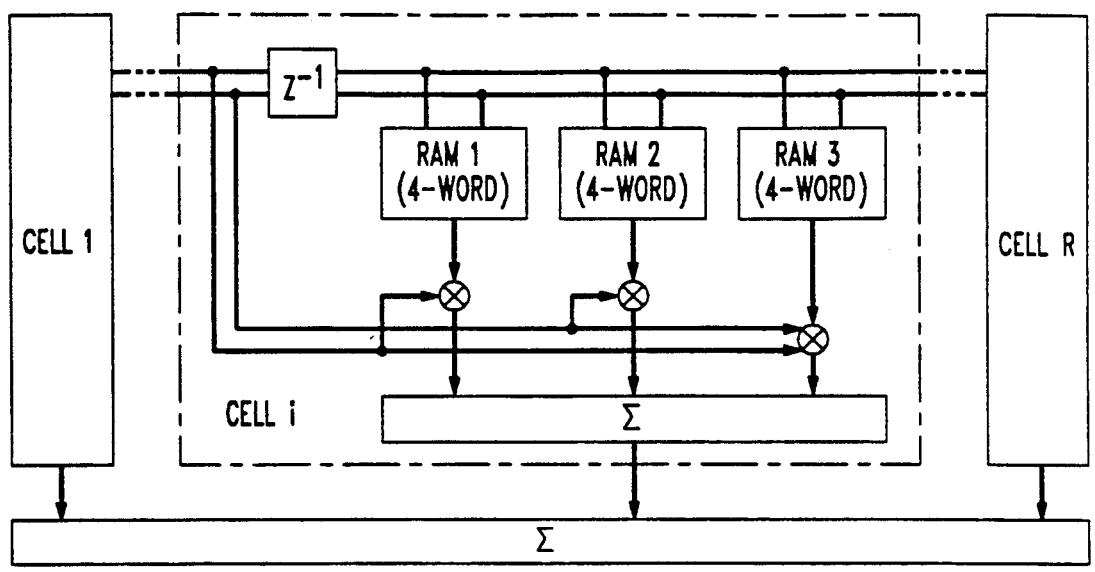
FIG. 4 shows a reduced redundancy echo canceler organization for use within the structure shown in FIG. 1.

The redundant terms can be eliminated if, using the factorization of Eq. (13), each 16-entry lookup table is split into four 4-entry lookup tables. Then, redundant terms of (15) can be associated to one of the four tables, and therefore, eliminated by deleting that table. The resulting structure is shown in FIG. 4. Although the method to eliminate redundant terms has been presented in the context of the specific embodiment of FIG. 4, it is general, and it can be applied to other lookup table structures.

Figure 5:
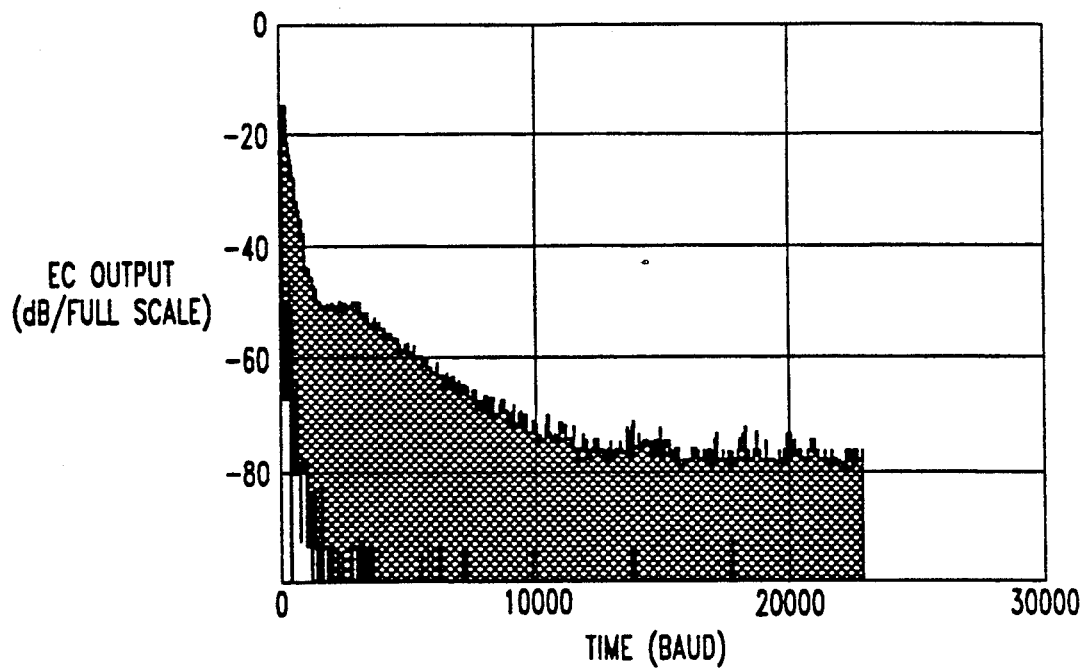
FIG. 5 is a graph showing the convergence for a typical echo canceler of the type shown in FIG. 1.
Figure 6:
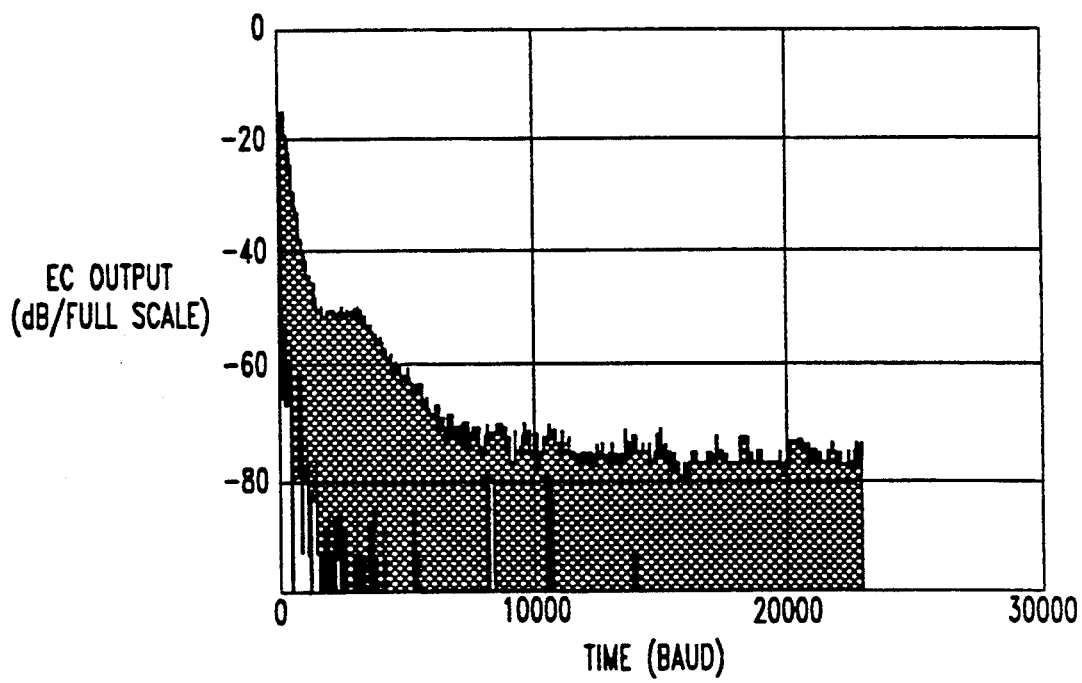
FIG. 6 is graph showing the convergence for a typical echo canceler of the type shown in FIG. 3.

Results of using the echo cancelers of FIGS. 1 and 4 for the case $R=8$, using an adaptation step size of $2^{-8}$ are shown in FIGS. 5 and 6, respectively. The improved convergence of the factored structure of FIG. 4 compared to the structure of FIG. 1, is apparent in FIGS. 5 and 6. In accordance with standard practice, the non-linear echo cancelers of FIGS. 1 and 4 (whose convergence is shown in FIGS. 5 and 6, respectively) are each advantageously preceded by a linear echo canceler, which is converged first, i.e., until a nonlinearity floor is reached in the canceler output. At this point, the nonlinear canceler is enabled.

Figure 7:
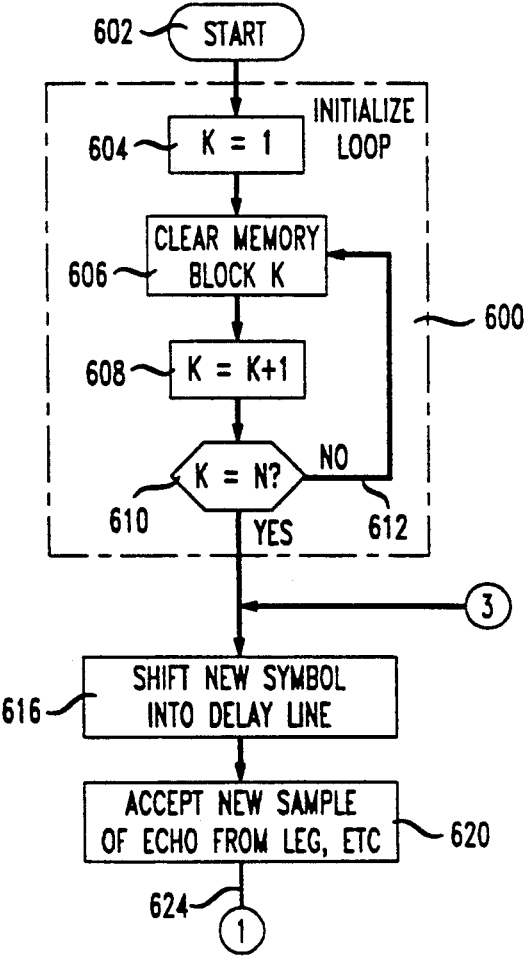
FIGS. 7–9 are flowcharts illustrating operation of the system of FIG. 3 operating within the system of FIG. 1.
Figure 9:
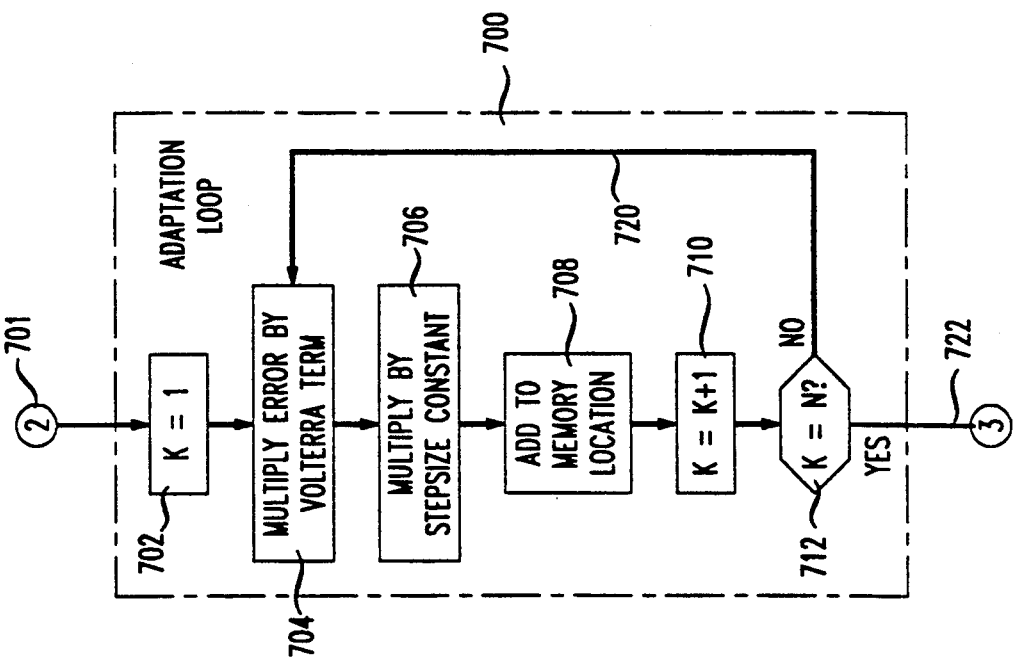
Figure 8:
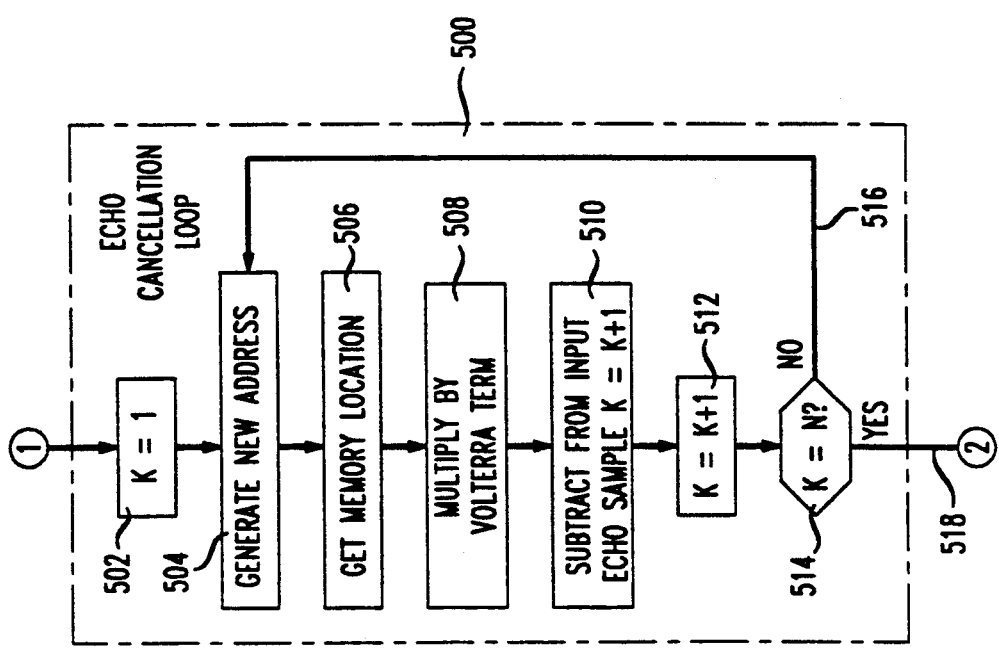

FIGS. 7–9 are flowcharts representing the processing of an echo canceler of the type shown in FIGS. 1 and 3. FIG. 6 includes the initialization loop 600 which causes each of N memory blocks to be cleared of any preexisting values. After initialization a new transmitted symbol is shifted into the delay line as indicated by block 616. This occurs at the band rate for the system incorporating the illustrative echo canceler. It is illustratively assumed that the symbol is a four-level signal susceptible of being represented by 4 bits.

A new echo sample from the line is accepted as indicated at block 620 of FIG. 6. This echo sample is typically converted by an analog to digital converter and filtered before being presented to the echo canceler of FIG. 1 and 3. Also, as indicated earlier, the linear echo cancellation (LEC) is assumed to have already been accomplished. The transition from the linear echo cancellation to the nonlinear echo cancellation is clearly demarked in FIGS. 5 and 6 by the transition plateau in those convergence plots.

Turning to the flowchart of FIG. 8, we see the actual echo cancellation operations as represented by the echo cancellation loop 500. Following the symbol and echo operations of FIG. 7, the cancellation operations are performed iteratively under the control of the index value k, starting with $k=1$ in block 502. The new memory address is generated at block 504 based on the system organization. The resulting address is used as indicated at block 506 to obtain the contents of the memory location representing the currently relevant echo information in preparation for multiplication using the Volterra terms as indicated in the analysis above. The process is then repeated until all needed memory locations have been access, as determined by the incrementing at block 512 and test at test 712.

Adaptation of the memory location contents is achieved as indicated in the flowchart of FIG. 9. Overall, the adaptation loop 700 shown there scans over the memory locations using the blocks 702, 710 and 712 in common with the flowcharts of FIGS. 8 and 9. At each memory location, an increment (or decrement) is made to the memory location as indicated by block 708, based on a value determined in block 704 equal to the error multiplied by the same Volterra term used in the process described in FIG. 8 and further determined by a constant multiplicative value chosen to allow convergence in appropriate steps. The multiplicative value is typically a small number, such as 1/256.

While the above-described echo cancelation method has proceeded in terms of a particular characterization of a table-lookup method, using illustrative operational parameters, it should be understood that other particular factorizations, table sizes and other system parameters can be selected as required by particular applications of the invention.

Further, while the present disclosure has emphasized change in memory organization and simplified processing in accordance with a particular Volterra expansion, it should be understood that the present invention will find application in a variety of echo-canceler arrangements. Typical of the contexts in which such use will occur are the various systems described in the Agazzi, et al 1982 and 1985 papers, supra. These references are hereby incorporated by reference as if set forth in their entirety herein.

I claim:

1. An echo canceler for generating an echo replica in response to a sequence of transmitted symbols, each symbol represented as an M-bit word, $M<1$, the echo canceler comprising:
   a series of echo canceler stages, each stage including at least one look-up table;
   means for applying each bit of each word to a successive pair of the echo canceler stages and means for addressing locations in each look-up table in each stage using a first subset of bits applied to that stage;
   means for multiplying the output of each look-up table by a respective subset of a second subset of the bits applied to that stage; and
   means for generating the echo replica as a function of the resulting products in each stage.

2. The echo canceler of claim 1 wherein the bits in said first and second subsets are such that a particular term in a Volterra Series Expansion of the echo replica is not represented in the Volterra Series Expansion.

3. The echo canceler of claim 1 further comprising means for adapting entries in locations of each look-up table by adding to the entry of the addressed location the product of an echo cancelation error, a gain factor and the bits in the subset of the second subset.

4. The echo canceler of claim 1 wherein said first subset of bits and said second subset of bits have no bits in common.

5. An echo canceler for generating an echo replica in response to a sequence of transmitted symbols, each symbol represented as an M-bit word, M≧1, the echo canceler comprising:
- a series of echo canceler stages, each stage including at least one look-up table;
- means for applying each bit of each word to a successive pair of the echo canceler stages;
- means for addressing locations in each look-up table in each stage using the bits applied to that stage which are also applied to an adjacent stage to obtain an output from each look-up table;
- means for multiplying the output of each look-up table by a respective different subset of the bits applied to that stage which are not applied to the adjacent stage wherein each respective subset comprises at least one bit; and
- means for generating the echo replica as a function of the resulting products in each stage.

6. The echo canceler of claim 5 wherein the bits in said first and second subsets being such that a particular term in a Volterra Series Expansion of the echo replica is not represented in the Volterra Series Expansion.

7. The echo canceler of claim 5 further comprising means for adapting entries in locations of each look-up table by adding to the entry of the addressed location the product of an echo cancelation error, a gain factor and the bits in the respective different subset.

8. An echo canceler for generating an echo replica in response to a sequence of transmitted symbols, each symbol represented as an M-bit word, M≧1, the echo canceler comprising:
- a series of echo canceler stages, each stage including at least one look-up table;
- means for applying each bit of each word to a plurality of echo canceler stages;
- means for addressing locations in each look-up table in each stage using the bits applied to that stage which are also applied to other stages to obtain an output from each look-up table;
- means for multiplying the output of each look-up table by a respective different subset of the bits applied to that stage which are not applied to the other stages wherein each subset comprises at least one bit; and
- means for generating the echo replica as a function of the resulting products in each stage.

9. A method for generating an echo replica in response to a sequence of transmitted symbols, each symbol represented as an M-bit word, M≧1, the method comprising the steps of:
- applying each bit of each word to a successive pair of echo canceler stages in a plurality or echo canceler stages, wherein each stage includes at least one look-up table, and addressing locations in each look-up table in each stage using a first subset of bits applied to that stage;
- multiplying the output of each look-up table by a respective subset of a second subset of the bits applied to that stage; and
- generating the echo replica as a function of the resulting products in each stage.

10. The method of claim 9 wherein the bits in said first and second subsets are such that a particular term in a Volterra Series Expansion of the echo replica is not represented in the Volterra Series Expansion.

11. The method of claim 9 further comprising the step of adapting entries in locations of each look-up table by adding to the entry of the addressed location the product of an echo cancelation error, a gain factor and the bits in the subset of the second subset.

12. The echo of canceler of claim 9 wherein said first subset of bits and said second subset of bits have no bits in common.

13. A method for generating an echo replica in response to a sequence of transmitted symbols, each symbol represented as an M-bit word, M≧1, the method comprising the steps of:
- means for applying each bit of each word to a successive pair of the echo canceler stages in a plurality of echo canceler stages, wherein each stage includes at least one look-up table;
- addressing locations in each look-up table in each stage using the bits applied to that stage which are also applied to an adjacent stage to obtain an output from each look-up table;
- multiplying the output of each look-up table by a respective different subset of the bits applied to that stage which are not applied to the adjacent stage wherein each respective subset comprises at least one bit; and
- generating the echo replica as a function of the resulting products in each stage.

14. The method of claim 13 wherein the bits in said first and second subsets being such that a particular term in a Volterra Series Expansion of the echo replica is not represented in the Volterra Series Expansion.

15. The method of claim 13 further comprising the step of adapting entries in locations of each look-up table by adding to the entry of the addressed location the product of an echo cancelation error, a gain factor and the bits in the respective different subset.

16. A method for generating an echo replica in response to a sequence of transmitted symbols, each symbol represented as an M-bit word, M≧1, the method comprising the steps of:
- applying each bit of each word to a first plurality of echo canceler stages in a second plurality of echo canceler stages, wherein each stage includes at least one look-up table;
- addressing locations in each look-up table in each stage using the bits applied to that stage which are also applied to other stages to obtain an output from each look-up table;
- multiplying the output of each look-up table by a respective different subset of the bits applied to that stage which are not applied to the other stages wherein each subset comprises at least one bit; and
- generating the echo replica as a function of the resulting products in each stage.

* * * * *

UNITED STATES PATENT AND TRADEMARK OFFICE
CERTIFICATE OF CORRECTION

PATENT NO. : 5,329,586
DATED : July 12, 1994
INVENTOR(S) : Oscar E. Agazzi

It is certified that error appears in the above-identified patent and that said Letters Patent is hereby corrected as shown below:

Column 6, claim 1, line 42, "$M < 1$", should be --$M \geq 1$--.

Signed and Sealed this

Twenty-ninth Day of August, 1995

Attest:

BRUCE LEHMAN

Attesting Officer     Commissioner of Patents and Trademarks